United States Patent
Steele et al.

(10) Patent No.: US 10,065,518 B2
(45) Date of Patent: Sep. 4, 2018

(54) METHOD AND APPARATUS TO CONTROL AN OFF-BOARD CHARGING DEVICE

(71) Applicant: GM GLOBAL TECHNOLOGY OPERATIONS LLC, Detroit, MI (US)

(72) Inventors: Russell K. Steele, Clinton Township, MI (US); Peter Kung Chiang, Carmel, IN (US); Brandon R. Jones, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/157,961

(22) Filed: May 18, 2016

(65) Prior Publication Data

US 2017/0334304 A1    Nov. 23, 2017

(51) Int. Cl.

| | |
|---|---|
| *B60L 9/00* | (2006.01) |
| *B60L 11/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *B60L 11/18* | (2006.01) |
| *H02J 7/00* | (2006.01) |

(52) U.S. Cl.
CPC ....... *B60L 11/1838* (2013.01); *B60L 11/1861* (2013.01); *H02J 7/007* (2013.01); *B60L 2240/36* (2013.01); *B60L 2240/662* (2013.01); *B60L 2240/80* (2013.01); *B60L 2260/44* (2013.01); *Y02T 10/705* (2013.01); *Y02T 10/7005* (2013.01); *Y02T 10/7044* (2013.01); *Y02T 10/7072* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01)

(58) Field of Classification Search
USPC .......................................................... 701/22
See application file for complete search history.

(56) References Cited

U.S. PATENT DOCUMENTS

| | | | | |
|---|---|---|---|---|
| 5,563,496 A | * | 10/1996 | McClure | H02J 7/0081 320/128 |
| 7,002,265 B2 | * | 2/2006 | Potega | B60L 11/185 307/149 |
| 7,301,308 B2 | * | 11/2007 | Aker | H02J 7/0042 320/139 |
| 8,892,495 B2 | * | 11/2014 | Hoffberg | G06N 7/06 706/48 |
| 8,901,885 B2 | * | 12/2014 | Kelty | B60L 1/02 320/116 |

(Continued)

*Primary Examiner* — Jean Paul Cass
(74) *Attorney, Agent, or Firm* — Quinn IP Law

(57) ABSTRACT

An off-board charging device disposed to electrically charge an electric energy storage system via an electrical charging system on-board a vehicle is described. This includes an electric machine electrically connected to the electric energy storage system and is disposed to supply propulsion effort to the vehicle. A method for controlling the off-board charging device includes determining severity of a drive cycle that occurs prior to a charging event for the electric energy storage system. A charging profile is determined based upon the severity of the drive cycle. A controller commands operation of the off-board charging device based upon the charging profile.

17 Claims, 5 Drawing Sheets

(56) References Cited

U.S. PATENT DOCUMENTS

| | | | | |
|---|---|---|---|---|
| 8,907,629 B2* | 12/2014 | Kelty | .................... | B60L 11/187 |
| | | | | 320/132 |
| 9,026,286 B2* | 5/2015 | Yamamoto | ............. | B60K 6/445 |
| | | | | 180/65.285 |
| 2009/0072790 A1* | 3/2009 | Ibrahim | ................ | H02J 7/0031 |
| | | | | 320/134 |
| 2009/0140698 A1* | 6/2009 | Eberhard | ................ | H02J 7/045 |
| | | | | 320/152 |
| 2009/0174362 A1* | 7/2009 | Richardson | ............. | F02N 11/10 |
| | | | | 320/105 |
| 2010/0072954 A1* | 3/2010 | Kohn | .................... | H02J 7/0091 |
| | | | | 320/152 |
| 2012/0038315 A1* | 2/2012 | Wong | .................... | H02J 7/0018 |
| | | | | 320/107 |

* cited by examiner

METHOD AND APPARATUS TO CONTROL AN OFF-BOARD CHARGING DEVICE

TECHNICAL FIELD

This disclosure relates to electrically-powered vehicles, and off-board electrical charging systems associated therewith.

BACKGROUND

Vehicles may employ an on-board electrical energy storage system that may provide electric power that may be used by an electric motor/generator for vehicle propulsion and other purposes. An electric charging system may be employed to electrically charge an on-board electrical energy storage system. An off-board charging module may connect to an on-board electric power distribution system that is part of an electric charging system. Electric power flow to effect charging may be limited due to design constraints of the on-board electric power distribution system and the electric charging system. Charging time to achieve a maximum state-of-charge of an on-board electrical energy storage system is determined based upon magnitude of electric power flow.

SUMMARY

An off-board charging device disposed to electrically charge an electric energy storage system via an electrical charging system on-board a vehicle is described. This includes an electric machine electrically connected to the electric energy storage system and is disposed to supply propulsion effort to the vehicle. A method for controlling the off-board charging device includes determining severity of a drive cycle that occurs prior to a charging event for the electric energy storage system. A charging profile is determined based upon the severity of the drive cycle. A controller commands operation of the off-board charging device based upon the charging profile.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
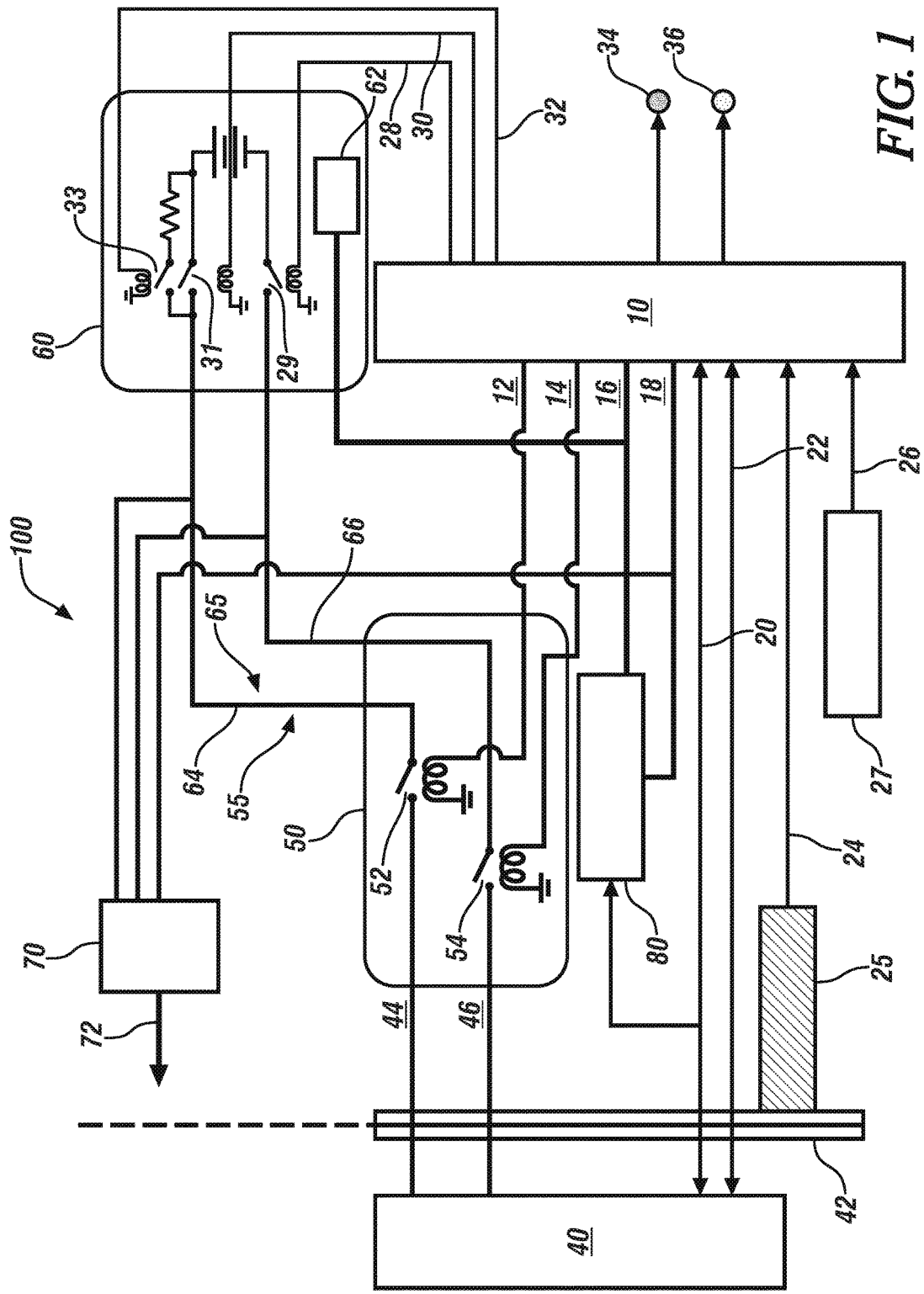
FIG. 1 schematically illustrates a portion of an electric charging system for a vehicle that includes an on-board electrical energy storage system that may be charged via an on-board electric power distribution system that can electrically connect to an off-board charging module, in accordance with the disclosure.

Referring now to the drawings, which are provided for the purpose of illustrating certain exemplary embodiments only and not for the purpose of limiting the same, FIG. 1 schematically illustrates a portion of an electric charging system 100 for a vehicle that includes an on-board electrical energy storage system (ESS) 60 that may be charged via an on-board electric power distribution system 55 that can electrically connect to an off-board charging module 40. Like numerals indicate like or corresponding parts throughout the several views. The vehicle may be an electric vehicle, a fuel-electric hybrid vehicle, or another vehicle configuration that employs electric power stored on an on-board energy storage system to operate one or a plurality of electric machines (not shown) for vehicle propulsion. The vehicle may include, by way of non-limiting examples, a passenger vehicle, a light-duty or heavy-duty truck, a utility vehicle, an agricultural vehicle, an industrial/warehouse vehicle, or a recreational off-road vehicle. As employed herein, the terms "charge" and "charging" and any other related terms refer to flow of electric power, e.g., current to a device that is capable of storing such electric power.

The on-board electric power distribution system 55 includes a high-power distribution module (HPDM) 50 and an auxiliary power module (APM) 70 that electrically connect via a high-voltage DC power bus 65 to the ESS 60. The on-board electric power distribution system 55 is preferably configured to supply high-voltage electric power via the high-voltage DC power bus 65 from the ESS 60 to an inverter (not shown) to operate the electric machine as an electric torque motor or as an electric power generator in response to control commands originating from a controller. Such operation is known and thus not described in detail herein. A vehicle integration control module (controller) 10 monitors various sensors and communicates with the off-board charging module 40, the HPDM 50, the ESS 60, and the APM 70 to control and manage electrical charging of the ESS 60. This includes controlling electrical charging of the ESS 60 via the off-board charging module 40 when the vehicle 100 is stationary and the off-board charging module 40 is connected via a charging coupler 42. Communication can be in the form of direct wiring, a communication bus, e.g., a high-speed local area connection (LAN) 18, or another suitable communication mechanism. A power line communication module 80 may be employed to monitor communication between the various modules.

The off-board charging module 40 connects to the vehicle 100 via the charge coupler 42, which includes connections for communications and for supplying a high-voltage power supply. The high-voltage power supply includes a positive power bus 44 and a negative power bus 46, which are electrically connected to the HPDM 50. The communication connection includes a proximity indicator 22, which indicates to the controller 10 that the off-board charging module 40 is connected to the charge coupler 42. A communication link 20 provides a communication therebetween.

The controller 10 is configured to monitor various input signals and generate commands for controlling the off-board charging module 40 and other devices. The controller 10 monitors signals from a battery controller 62 associated with the ESS 60, which communicates battery data including voltage level, current and temperature via a first communication link 16. Other monitored input signals to the controller 10 include ambient temperature 26, which is preferably supplied by a temperature sensor 27 that is suitably located, and connector temperature 24, which is preferably supplied by a temperature sensor 25 that is located at the charge coupler 42. The controller 10 communicates with and controls switches 52, 54 of the HPDM 50 via control lines 12, 14, respectively, to electrically connect the positive power bus 44 to a positive high-voltage bus (HV+) 64 and electrically connect the negative power bus 46 to a negative high-voltage bus (HV−) 66, respectively, wherein HV+ 64 and HV− 66 compose the high-voltage DC power bus 65. The controller 10 communicates with and controls switches 29, 31 via control lines 28, 30, respectively, to electrically connect HV+ 64 to a positive power side of the ESS 60 and electrically connect HV− 66 to a negative power side of the ESS 60, respectively. HV bus pre-charge control is supplied from the controller 10 to switch 33 in the ESS 60 via a line 32. In one embodiment, a main service disconnect device (not shown) may be installed in series with the cells of the ESS 60. The controller 10 communicates a charge status 34 and an AC power connection status 36 to a vehicle operator via on-dash lamps or other suitable devices.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or any other suitable communication link, e.g., as described with reference to FIG. 1. Communication includes exchanging data signals in any suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to any physically discernible indicator that conveys information, and may be any suitable waveform (e.g., electrical, optical, magnetic, mechanical or electromagnetic), such as DC, AC, sinusoidal-wave, triangular-wave, square-wave, vibration, and the like, that is capable of traveling through a medium. The term 'model' refers to a processor-based or processor-executable code and associated calibration that simulates a physical existence of a device or a physical process.

The APM 70 is an electric power conversion device that is configured to convert high-voltage electrical power supplied from the high-voltage DC power bus 65 to low-voltage DC electrical power 72 that may be employed to power auxiliary on-vehicle devices such as lighting systems, infotainment systems, and other systems. Electric power conversion devices, e.g., inverters, are known and not described in detail herein.

The on-board electric power distribution system 55 may be configured to achieve a power rating that accounts for design factors and interfaces of the various components, including the HV+ 64 and HV− 66 of the high-voltage DC power bus 65 and the switches 52, 54, 29, 31 and 33. The HV+ 64 and HV− 66 of the high-voltage DC power bus 65 and the switches 52, 54, 29, 31 and 33 are fabricated from electrically conductive devices and materials, including, e.g., cables, buses, contactors and other related elements. Each of the aforementioned devices and junctions of those devices have design factors that are related to current density, current carrying capacity and temperature, all of which may be interrelated. Some parameters that may be taken into consideration include, e.g., electrical conductivity, electrical resistivity, heat generation, and electromagnetic interference. Design factors including materials, dimensional requirements, junctions and the like are selected based upon the power rating.

A default power rating can be determined that is related to a maximum permissible electrical current associated with charging the ESS 60 when taking into account the design factors for the various elements of the on-board electric power distribution system 55 when subjected to extreme ambient and operating conditions. The default power rating indicates an average or maximum magnitude of electric power (kV, amps, voltage) that can be transferred without reducing service life of the components or affecting related components when the on-board electric power distribution system 55 and the ESS 60 are operating at the extreme ambient and operating conditions. Such conditions may include, for example, extremes related to ambient temperature, component or system operating temperatures, humidity, shock, vibration, electromagnetic interference, noise, grounding, dust, contamination, etc. A maximum power rating indicates an average or maximum magnitude of electric power (kV, amps, voltage) that can be transferred without reducing service life of the components or affecting related components when the on-board electric power distribution system 55 and the ESS 60 are operating at ambient and operating conditions that are not at the extremes. The maximum power rating takes into account the design factors for the various elements of the on-board electric power distribution system 55.

Charging time to achieve a maximum state of charge (SOC) for the ESS 60 can be determined based upon a commanded charging electrical current that may be associated with the default power rating, the maximum power rating, or an intermediate power rating. The commanded charging electrical current is determined based upon the ambient conditions and the operating conditions and takes into account the design factors for the various components and interfaces of the on-board electric power distribution system 55. Under certain conditions, it may be advantageous to increase the magnitude of the electrical current that is used for charging to a level that is greater than a default current associated with the default power rating. Increasing the electrical charging current to a level greater than the default current may serve to reduce the charging time to achieve a maximum state of charge in the ESS 60. This is described with reference to FIG. 7.

Figure 2:
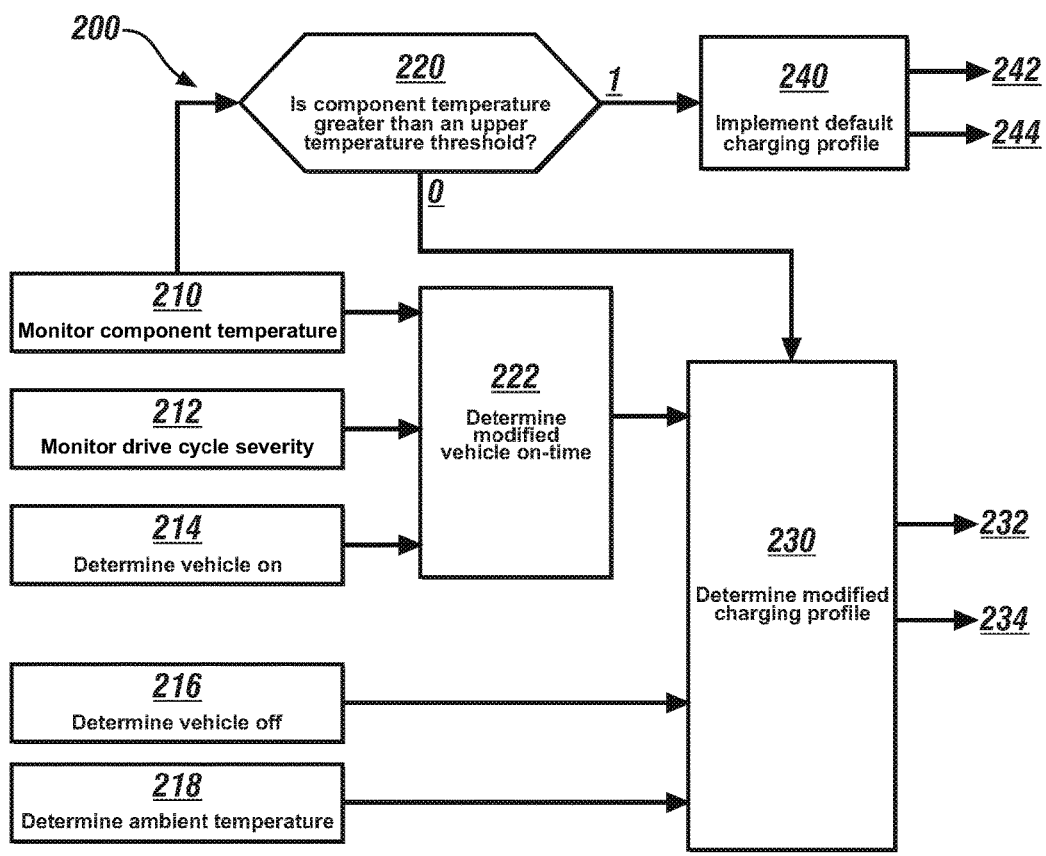
FIG. 2 shows a functional block diagram of a charging profile determination process that may be executed in a controller to command operation of an embodiment of the electrical charging system described with reference to FIG. 1, in accordance with the disclosure.

FIG. 2 shows a functional block diagram of a charging profile determination process 200 that may be executed in a controller, e.g., the controller 10 described with reference to FIG. 1, to command operation of an embodiment of the electrical charging system 100 described with reference to FIG. 1. The charging profile determination process 200 may be advantageously employed to control any electric charging system for a vehicle that includes an on-board electrical energy storage system that may be charged via an on-board electric power distribution system that can electrically connect to an off-board charging module, and is not limited to the on-board electric power distribution system 55 that is described with reference to FIG. 1.

The charging profile determination process 200 is executed to determine a charging profile that may be employed during a charging event to electrically charge the ESS 60 when the vehicle 100 is stationary. Examples of charging profiles are shown graphically with reference to FIG. 7. The charging profile determination process 200 is preferably executed when the vehicle 100 is stationary and a vehicle operator has indicated a desire to charge the ESS 60 by mechanically and electrically coupling an off-board charging module 40 to the off-board connector 42. Table 1 is provided as a key wherein the numerically labeled blocks and the corresponding functions are set forth as follows, corresponding to the charging profile determination process 200.

TABLE 1

| BLOCK | BLOCK CONTENTS |
| --- | --- |
| 210 | Monitor component temperature |
| 212 | Monitor drive cycle severity |
| 214 | Determine vehicle on-time |
| 216 | Determine vehicle off-time |
| 218 | Determine ambient temperature |
| 220 | Is component temperature greater than an upper temperature threshold? |
| 222 | Determine modified vehicle on-time |
| 230 | Determine modified charging profile |
| 240 | Implement default charging profile |

Execution of the charging profile determination process 200 may proceed as follows. The steps of the charging profile determination process 200 may be executed in any suitable order, and are not limited to the order described with reference to FIG. 2. Overall, the charging profile determination process 200 includes processes to monitor temperature of a component (210), determine severity of a drive cycle (212), and determine vehicle on-time (214), and then determine a modified vehicle on-time based thereon (222). The vehicle on-time is the accumulated amount of time that elapses while the vehicle is being driven, e.g., when the vehicle is on and not in Park. The vehicle on-time may be employed to moderate the charging profile to facilitate an improved charging profile and reduced charging time under certain conditions. This includes moderating the charging profile by reducing the charging current or reducing the charging time in response to an increase in the vehicle on-time, and increasing the charging current in response to a decrease in the vehicle on-time. When drive cycle current is not utilized, a worst-case drive cycle may be presumed during the duration of the vehicle on-time. The vehicle off-time is the accumulated amount of time that elapses between a vehicle key-off event and a subsequent vehicle key-on event, and accounts for component cooling when no current is flowing. The process to monitor temperature of a component (210) preferably includes monitoring, via a thermocouple, a thermistor or another sensing device, temperature(s) of one or more components of the electrical charging system 100. Alternatively, the temperature(s) of one or more components of the electrical charging system 100 may be determined via a temperature model.

The temperature of the component of the electrical charging system 100 is compared with an upper temperature threshold (220). When the temperature of the component of the electrical charging system 100 is greater than the upper temperature threshold (220)(1), a default charging profile that includes a default current 242 and a default charging time 244 is implemented and communicated by the controller 10 to the off-board charging module 40 as control commands (240).

When the temperature of the component of the electrical charging system 100 is less than the upper temperature threshold (220)(0), the charging profile determination process 200 further includes processes to monitor vehicle off-time (216) and an ambient temperature (218). The modified vehicle on-time, the vehicle off-time and the ambient temperature are employed to determine a modified charging profile (230). The modified charging profile includes a modified charging current 232 and a modified charging time period 234, wherein the modified charging current 232 is preferably greater than the default current 242 and the modified charging time 234 is preferably less than the default charging time 244. The modified current 232 and modified charging time period 234 are communicated by the controller 10 to the off-board charging module 40 as control commands (240). Examples of a default charging profile and a modified charging profile are shown graphically with reference to FIG. 7.

Figure 6:
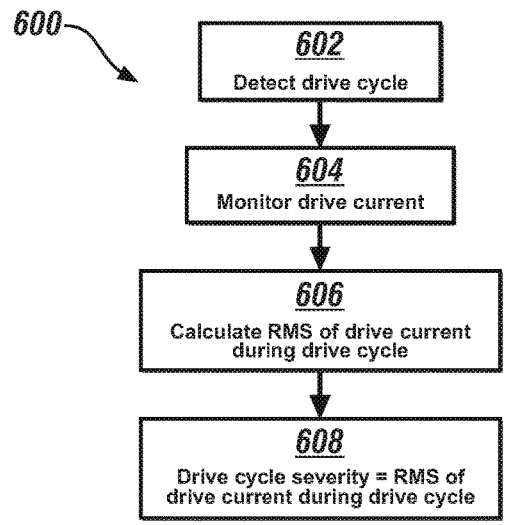
FIG. 6 shows a functional block diagram of a severity determination process that may be executed in a controller to determine the severity of the drive cycle that is employed in the charging profile determination process that is described with reference to FIG. 2.

FIG. 6 shows a functional block diagram of a severity determination process 600 that may be executed in the controller 10 to determine the severity of the drive cycle (212) that is employed in the charging profile determination process 200 that is described with reference to FIG. 2. Table 2 is provided as a key wherein the numerically labeled blocks and the corresponding functions are set forth as follows, corresponding to the severity determination process 600.

TABLE 2

| BLOCK | BLOCK CONTENTS |
| --- | --- |
| 602 | Detect drive cycle |
| 604 | Monitor drive current |
| 606 | Calculate RMS of drive current during drive cycle |
| 608 | Drive cycle severity = RMS of drive current during drive cycle |

Execution of the severity determination process 600 may proceed as follows. The steps of the process 600 may be executed in any suitable order, and are not limited to the order described with reference to FIG. 6. The severity determination process 600 initiates upon detecting initiation of a drive cycle (602), which may correspond to a vehicle key-on event or another related indicator. The drive cycle ends when a subsequent key-off event occurs. During each drive cycle, drive current is monitored (604). Monitoring the drive current includes a time-based monitoring of a magnitude of current that is supplied to one or more electric machines for vehicle propulsion. The severity determination process 600 evaluates the time-based magnitude of current flow, which may include calculating a root-mean-square (RMS) value of the current during the drive cycle (606) in one embodiment. The RMS value of the current during the drive cycle may be employed to indicate a drive cycle severity state (608). Other suitable analytical methods for evaluating and quantifying current flow during a drive cycle may be effectively employed, such as an integration method.

Figure 3:
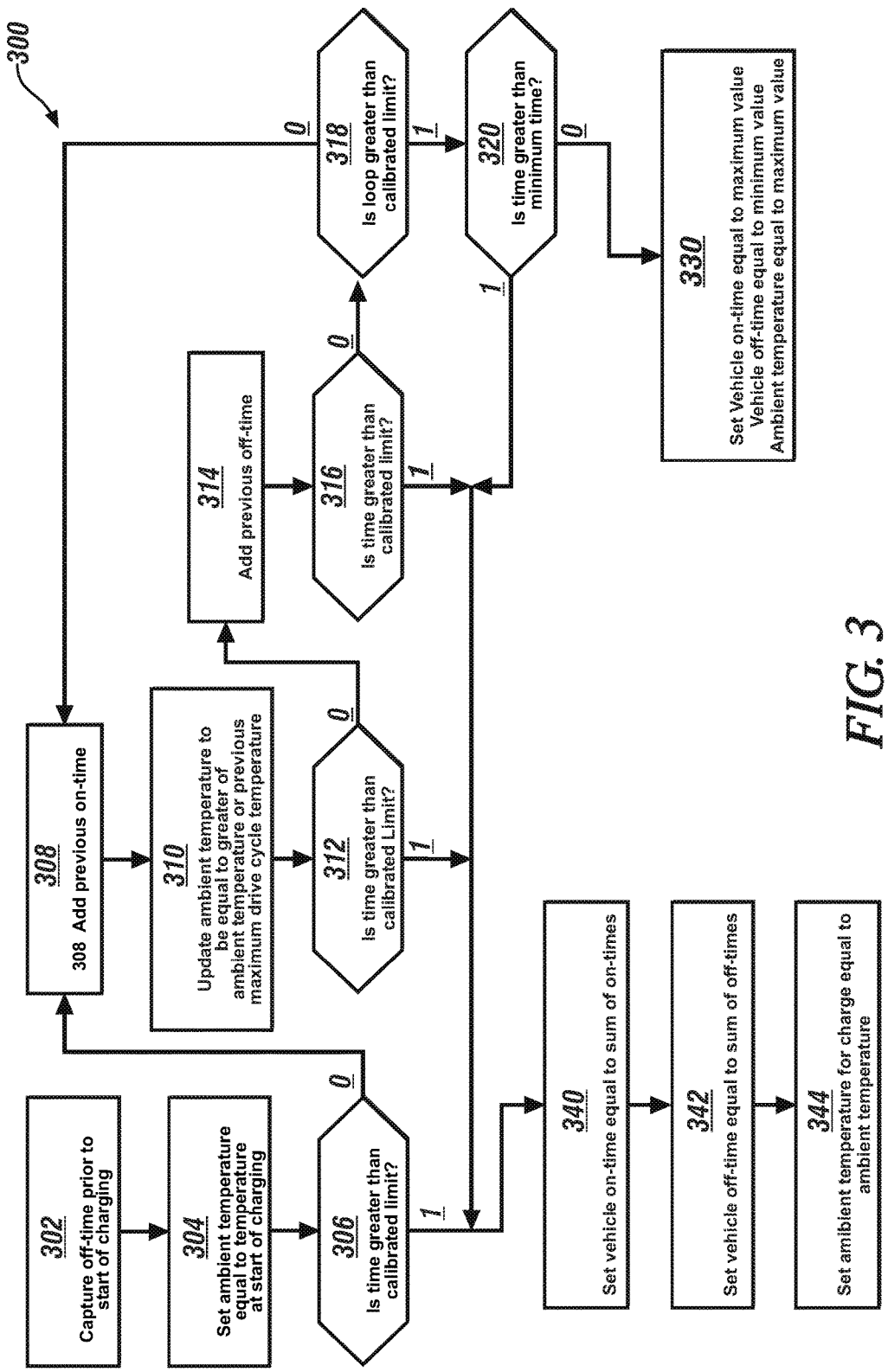
FIG. 3 shows a functional block diagram of a process that may be executed in a controller to determine a vehicle on-time, a vehicle off-time and ambient temperature at the charge time that are employed in the charging profile determination process that is described with reference to FIG. 2, in accordance with the disclosure.

FIG. 3 shows a functional block diagram of a process 300 that may be executed in the controller 10 to determine the vehicle on-time (214), the vehicle off-time (216) and the ambient temperature at the charge time (218) that are employed in the charging profile determination process 200 that is described with reference to FIG. 2. Table 3 is provided as a key wherein the numerically labeled blocks and the corresponding functions are set forth as follows, corresponding to the process 300.

TABLE 3

| BLOCK | BLOCK CONTENTS |
| --- | --- |
| 302 | Capture off-time prior to start of charging |
| 304 | Set ambient temperature equal to temperature at start of charging |
| 306 | Is time greater than calibrated limit? |
| 308 | Add previous on-time |
| 310 | Update ambient temperature to be equal to greater of ambient temperature or previous maximum drive cycle temperature |
| 312 | Is time greater than calibrated limit? |
| 314 | Add previous off-time |
| 316 | Is time greater than calibrated limit? |
| 318 | Is loop greater than calibrated limit? |
| 320 | Is time greater than minimum time? |
| 330 | Set Vehicle on-time equal to maximum value Vehicle off-time equal to minimum value Ambient temperature equal to maximum value |
| 340 | Set vehicle on-time equal to sum of on-times |
| 342 | Set vehicle off-time equal to sum of off-times |
| 344 | Set ambient temperature for charge equal to ambient temperature |

Execution of the process 300 may proceed as follows. The steps of the process 300 may be executed in any suitable order, and are not limited to the order described with reference to FIG. 3.

Upon initiation, the vehicle off-time prior to starting the vehicle charging event is captured (302), and the ambient temperature is set equal to the monitored temperature at the start of off-board charging (304). This is described in greater detail with reference to FIG. 4. Elapsed time is monitored to determine if it is greater than a calibration limit, e.g., 4 hours (306), and if not (306)(0), the previous on-time is added (308), and the ambient temperature is updated to be equal to the greater of the ambient temperature and a maximum temperature associated with a previous drive cycle (310). This is described in greater detail with reference to FIG. 5.

Elapsed time is monitored to determine if it is greater than the calibration limit, e.g., 4 hours (312), and if not (312)(0), the previous off-time is added (314), and the elapsed time is monitored to determine if it is greater than the calibration limit, e.g., 4 hours (316). If the elapsed time is less than the calibration limit, e.g., 4 hours (316)(0), a loop time is compared to a calibration limit (318). When the loop time is less than the calibration limit (318)(0), the previous on-time for the loop is added (308), and the process repeats. When the loop time is greater than the calibration limit (318)(1), the elapsed time is compared to a minimum threshold (320). When the elapsed time is greater than the minimum threshold (320)(0), the vehicle on-time is set equal to a maximum value, the vehicle off-time is set equal to a minimum value, and the ambient temperature is set equal to a maximum value (330).

When the elapsed time is greater than the calibration limit under any of the previous circumstances, i.e., (306)(1), (312)(1), (316)(1) or (320)(1), the vehicle on-time is set equal to a sum of the on-times (340), the vehicle off-time is set equal to a sum of the off-times (342) and the ambient temperature is set equal to the ambient temperature that was previously determined (344). In this manner, the vehicle on-time, the vehicle off-time and the ambient temperature are based upon a period of time prior to the charging event, regardless of the quantity of trips that may have occurred.

Figure 4:
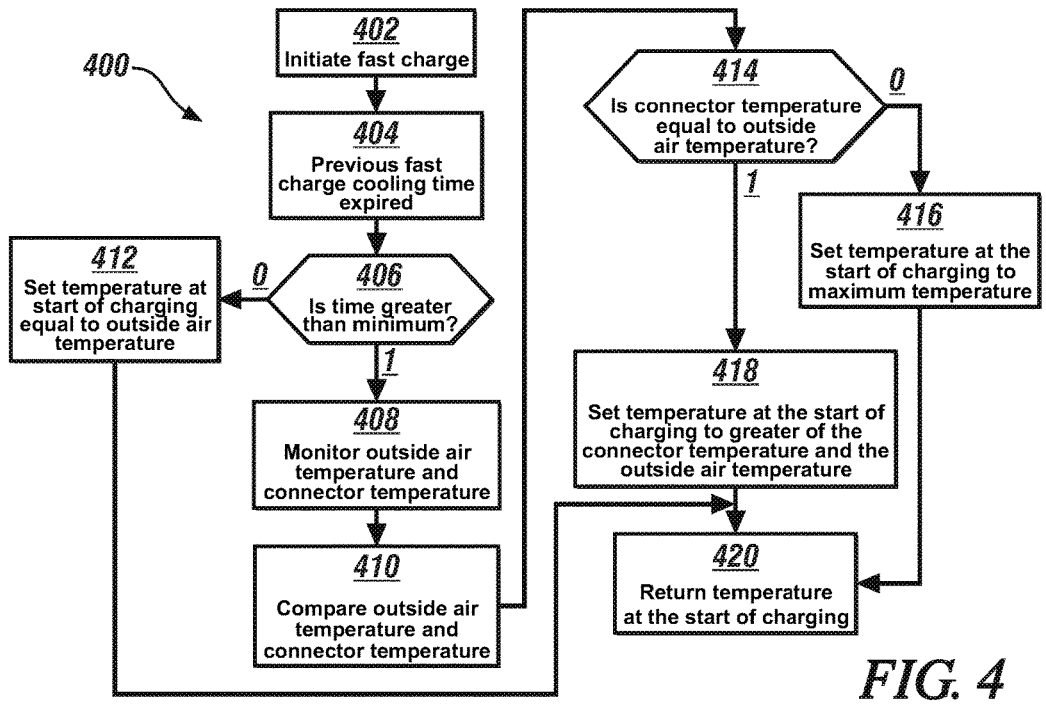
FIG. 4 shows a functional block diagram of a process that may be executed in a controller to determine the temperature at the start of charging, which is employed in the process that is described with reference to FIG. 3.

FIG. 4 shows a functional block diagram of a process 400 that may be executed in the controller 10 to determine the temperature at the start of the charging event, which is employed in the process 300 that is described with reference to FIG. 3. Table 4 is provided as a key wherein the numerically labeled blocks and the corresponding functions are set forth as follows corresponding to the process 400.

TABLE 4

| BLOCK | BLOCK CONTENTS |
| --- | --- |
| 402 | Initiate fast charge |
| 404 | Previous fast charge cooling time expired |
| 406 | Is time greater than minimum? |
| 408 | Monitor outside air temperature and connector temperature |
| 410 | Compare outside air temperature and connector temperature |
| 412 | Set temperature at start of charging equal to outside air temperature |
| 414 | Is connector temperature equal to outside air temperature? |
| 416 | Set temperature at the start of charging to maximum temperature |
| 418 | Set temperature at the start of charging to greater of the connector temperature and the outside air temperature |
| 420 | Return temperature at the start of charging |

Execution of the process 400 may proceed as follows. The steps of the process 400 may be executed in any suitable order, and are not limited to the order described with reference to FIG. 4. Upon initiating a fast charge event (402) after a previous fast charge cooling time has expired (404), the elapsed time is monitored to determine if it has exceeded a minimum soak time (406). When the elapsed time has exceeded the minimum soak time (406)(1), the outside air temperature and connector temperature are monitored (408) and compared (410). When the outside air temperature is approximately equal to the connector temperature (414)(1), the temperature at the start of charging is set equal to the greater of the connector temperature and the outside air temperature (418), and this value is returned to step 304 of the process 300 described with reference to FIG. 3 (420). When the outside air temperature differs from the connector temperature (414)(0), the temperature at the start of charging is set equal to a maximum temperature (416), and this value is returned to step 304 of FIG. 3 (420). When the elapsed time has not exceeded the minimum soak time (406)(0), the temperature at the start of charging is set equal to the outside air temperature (412), and this value is returned to step 304 of FIG. 3 (420).

Figure 5:
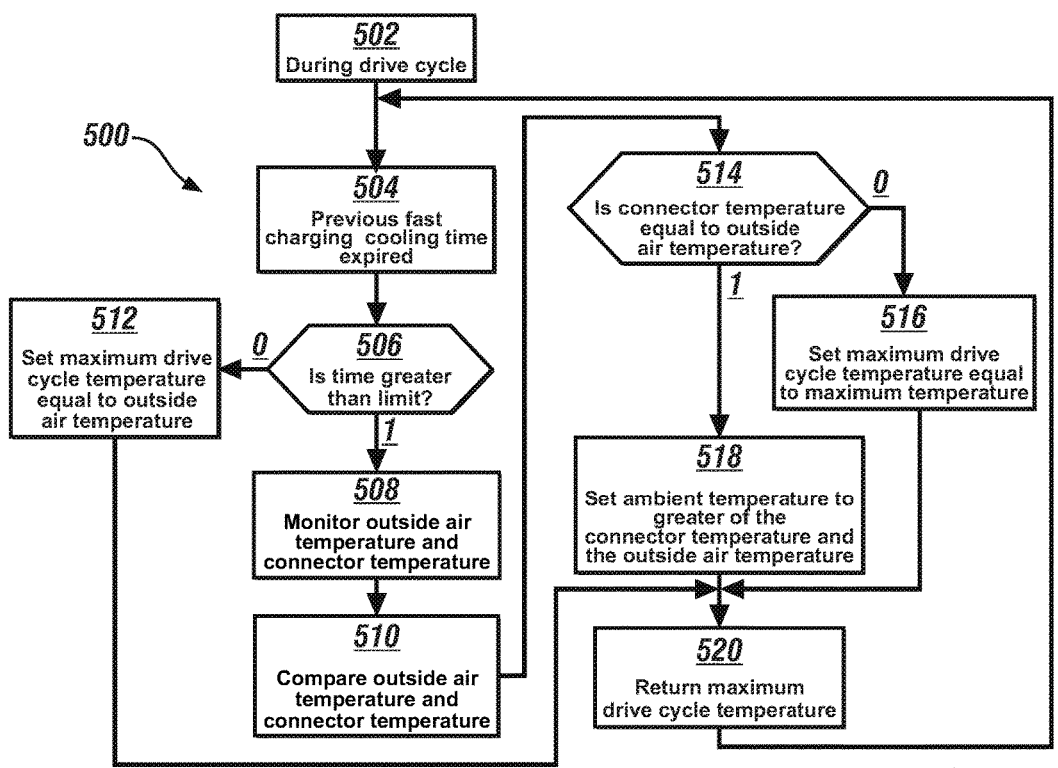
FIG. 5 shows a functional block diagram of a process that may be executed in a controller to determine a maximum temperature associated with a previous drive cycle that is employed in the process that is described with reference to FIG. 3.

FIG. 5 shows a functional block diagram of a process 500 that may be executed in the controller 10 to determine the maximum temperature associated with a previous drive cycle that is employed in step 310 of the process 300 that is described with reference to FIG. 3. Table 5 is provided as a key wherein the numerically labeled blocks and the corresponding functions are set forth as follows, corresponding to the process 500.

TABLE 5

| BLOCK | BLOCK CONTENTS |
|---|---|
| 502 | During drive cycle |
| 504 | Previous fast charging cooling time expired |
| 506 | Is time greater than limit? |
| 508 | Set maximum drive cycle temperature equal to outside air temperature |
| 510 | Monitor outside air temperature and connector temperature |
| 512 | Compare outside air temperature and connector temperature |
| 514 | Is connector temperature equal to outside air temperature? |
| 516 | Set maximum drive cycle temperature equal to maximum temperature |
| 518 | Set ambient temperature to greater of the connector temperature and the outside air temperature |
| 520 | Return maximum drive cycle temperature |

Execution of the process 500 may proceed as follows. The steps of the process 500 may be executed in any suitable order, and are not limited to the order described with reference to FIG. 5. The process 500 preferably executes during each drive cycle during an engine-on event, Upon initiating a fast charge event (502) after a previous fast charge cooling time has expired (504), the elapsed time is monitored to determine if it has exceeded a minimum operating time (506). When the elapsed time has exceeded the minimum operating time (506)(1), the outside air temperature and the connector temperature are monitored (510) and compared (512). When the outside air temperature is approximately equal to the connector temperature (514)(1), the temperature at the start of charging is set equal to the greater of the connector temperature and the outside air temperature (518), and this value is returned to step 310 of the process 300 described with reference to FIG. 3 (520). When the outside air temperature differs from the connector temperature (514)(0), the maximum drive cycle temperature is set equal to a maximum temperature (516), and this value is returned to step 304 of FIG. 3 (520). When the elapsed time has not exceeded the minimum drive time (506)(0), the maximum drive cycle temperature is set equal to the outside air temperature (508), and this value is returned to step 304 of FIG. 3 (520).

As previously described, the charging profile determination process 200 is executed to determine a charging profile that may be employed to electrically charge the ESS 60 when the vehicle 100 is stationary. The charging profile may include a default charging profile, or a modified charging profile that includes a selected modified charging current 232 and a selected modified charging time period 234. By way of non-limiting examples, Tables 6, 7 and 8 provide examples of a plurality of modified charging currents, which are determined in relation to the vehicle off-time, the vehicle on-time, and the ambient temperature. The modified charging currents provided in Tables 6, 7 and 8 may be determined during vehicle development, and stored in a non-volatile memory device as arrays that may be accessed and interrogated during vehicle operation. In this example, the default current is 150 Amps. Table 6 provides modified charging currents, which are determined in relation to a vehicle off-time of 0.5 H, with the vehicle on-time ranging between 5 and 60 minutes, and the ambient temperature ranging between 5 C and 45 C. It is appreciated that the modified charging current calibration for vehicle on-times of 5 minutes apply to vehicle on-times of less than 5 minutes. It is appreciated that the modified charging current calibration for vehicle on-times of 60 minutes apply to vehicle on-times of greater than 60 minutes. It is appreciated that the modified charging current calibration for ambient temperatures of 5 C apply to ambient temperatures of less than 5 C. It is appreciated that the modified charging current calibration for ambient temperatures of 45 C apply to ambient temperatures of greater than 45 C. As such, the default charging current of 150 Amps may be applied under certain conditions, but there are many operating conditions under which the modified charging current may be increased, up to a maximum charging current of 195 Amps. Increasing the charging current reduces total charging time.

TABLE 6

| | Vehicle Off-Time = 0.5 H | | |
|---|---|---|---|
| Ambient | Vehicle On-Time (Min) | | |
| Temperature | 5 | 20 | 60 |
| 45 C. | 150 | 150 | 150 |
| 35 C. | 150 | 150 | 150 |
| 25 C. | 160 | 160 | 160 |
| 15 C. | 175 | 175 | 175 |
| 5 C. | 195 | 195 | 195 |

TABLE 7

| | Vehicle Off-Time = 4.0 H | | |
|---|---|---|---|
| Ambient | Vehicle On-Time (Min) | | |
| Temperature | 5 | 20 | 60 |
| 45 C. | 160 | 150 | 150 |
| 35 C. | 175 | 160 | 150 |
| 25 C. | 195 | 170 | 160 |
| 15 C. | 195 | 180 | 175 |
| 5 C. | 195 | 195 | 195 |

TABLE 8

| | Vehicle Off-Time = 8.0 H | | |
|---|---|---|---|
| Ambient | Vehicle On-Time (Min) | | |
| Temperature | 5 | 20 | 60 |
| 45 C. | 170 | 155 | 150 |
| 35 C. | 185 | 165 | 160 |
| 25 C. | 195 | 185 | 180 |
| 15 C. | 195 | 195 | 195 |
| 5 C. | 195 | 195 | 195 |

Similarly, the modified charging profile may include a plurality of calibration tables containing modified charging time periods in relation to the ambient temperature, vehicle off-time and vehicle on-time that may be employed to electrically charge the ESS 60 when the vehicle 100 is stationary.

Figure 7:
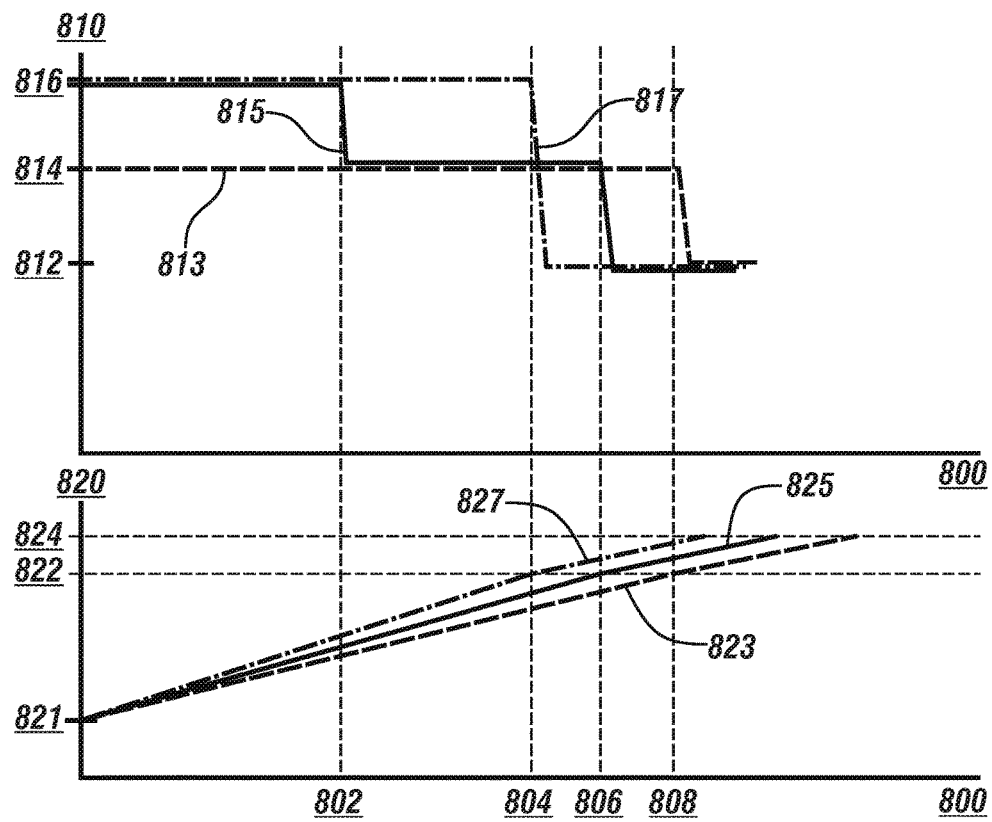
FIG. 7 graphically illustrates examples of charging profiles that may be employed to electrically charge an embodiment of the on-board electrical energy storage system described with reference to FIG. 1 when stationary, in accordance with the disclosure.

FIG. 7 graphically illustrates examples of charging profiles that may be employed to electrically charge an embodiment of the ESS 60 described with reference to FIG. 1 when an embodiment of the vehicle 100 described with reference to FIG. 1 is stationary. The charging profiles include a default charging profile 813, a first modified charging profile 815, and a second modified charging profile 817, which is a best-case modified charging profile associated with a maximum power rating for the on-board electric power distribution system 55. Each of the charging profiles preferably includes a charging current and a charging time period. The graphs include charging current (Amps) 810 and concurrent battery cell voltage (Volts) 820, which are indicated on vertical axes in relation to time 800, which is indicated on the horizontal axes. The battery cell voltage 820 includes an initial cell voltage 821, a bulk SOC voltage 822, and a constant voltage 824. The initial cell voltage 821 is related to voltage level of one of the battery cells at a start of a charging event after a discharge event. The bulk SOC voltage 822 is related to a cell voltage level that is associated with a maximum cell voltage, e.g., at a preset SOC level, which is 77% in one embodiment, and is determined to maintain or maximize service life of the ESS 60. The bulk SOC voltage 822 may be 4.10V in one embodiment. The constant voltage 824 is a steady-state voltage that is determined to maintain the SOC and maximize service life of the ESS 60. The constant voltage 824 may be 4.18V in one embodiment. The charging current 810 includes a maximum charging current 816, a default charging current 814 and a constant voltage current 812.

The maximum charging current 816 is associated with a maximum power rating for the on-board electric power distribution system 55. The default charging current 814 is associated with the default power rating for the on-board electric power distribution system 55. The constant voltage current 812 is associated with the constant voltage 824.

As indicated, when the default charging profile 813 is selected, the off-board charging module 40 is commanded to charge the ESS 60 at the default charging current 814, and the battery cell voltage increases as indicated by line 823 until time 808, when the bulk SOC voltage 822 is achieved.

When the second modified charging profile 817 is selected, the off-board charging module 40 is commanded to charge the ESS 60 at the maximum charging current 816, and the battery cell voltage increases as indicated by line 827 until time 804, when the bulk SOC voltage 822 is achieved.

When the first modified charging profile 815 is selected, the off-board charging module 40 is commanded to charge the ESS 60 at the maximum charging current 816 for a charging time period that expires at time 802, and then reduce the charging current to the default charging current 814 until time 806. The battery cell voltage increases as indicated by line 825 until time 806, when the bulk SOC voltage 822 is achieved. It is appreciated that the charging current and charging time period part of the charging profile that is selected as part of execution of the charging profile determination process 200. As such, the high power charging capability of the vehicle may be improved by considering ambient vehicle environmental conditions and previous vehicle usage. This includes permitting increased charging power under certain conditions, resulting in reduced charging times.

Those having ordinary skill in the art will recognize that the teachings described herein are in terms of functional and/or logical block components and/or various processing steps. It should be realized that such block components may be composed of hardware, software, and/or firmware components that are configured to perform the specified functions. That may include a vehicle computing system communicating with the one or more modules that may be implemented through a computer algorithm, machine executable code, non-transitory computer-readable medium, or software instructions programmed into a suitable programmable logic device(s) of the vehicle, such as the one or more modules, a server in communication with the vehicle computing system, a mobile device communicating with the vehicle computing system and/or server, other controller in the vehicle, or a combination thereof.

While the concepts described herein are susceptible of embodiment in many different forms, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the word "including" means "including without limitation."

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for controlling an off-board charging device disposed to electrically charge an electric energy storage system via an electrical charging system on-board a vehicle, wherein an electric machine is electrically connected to the electric energy storage system and is disposed to supply propulsion effort, the method comprising:
   monitoring, via a sensor, current supplied to the electric machine during a drive cycle occurring prior to a charging event;
   determining a severity of the drive cycle occurring prior to the charging event for the electric energy storage system based upon the monitored current;
   determining a charging profile based upon the severity of the drive cycle; and
   commanding, via the controller, operation of the off-board charging device when the vehicle is stationary based upon the charging profile; wherein determining the charging profile based upon the severity of the drive cycle includes:
  determining vehicle on-time,
  monitoring a temperature of a component of the electrical charging system and an ambient temperature,
  determining a modified vehicle on-time based upon the component temperature, the severity of the drive cycle, and the vehicle on-time,
  determining vehicle off-time, and
  determining a charging profile based upon the modified vehicle on-time, the vehicle off-time and the ambient temperature.

2. The method of claim 1, further comprising:
monitoring a temperature of a component of the electrical charging system during the drive cycle;
comparing the temperature of the component to an upper temperature threshold; and
selecting a default charging profile when the temperature of the component is greater than an upper temperature threshold.

3. The method of claim 2, wherein selecting the default charging profile comprises selecting a default charging current.

4. The method of claim 1, wherein the charging profile comprises a magnitude of charging current and an elapsed time for charging.

5. The method of claim 1, comprising selecting a default charging profile including a default charging current based upon the modified vehicle on-time, the vehicle off-time and the ambient temperature.

6. The method of claim 1, comprising selecting a modified charging profile including a charging current that is greater than the default charging current based upon the modified vehicle on-time, the vehicle off-time and the ambient temperature.

7. The method of claim 1, wherein commanding operation of the off-board charging device based upon the charging profile comprises commanding electric current flow and an elapsed charging time for the commanded electric current flow form the off-board charging device to the electric energy storage system.

8. A method for controlling an off-board charging device disposed to electrically charge an electric energy storage system via an electrical charging system on-board a vehicle, wherein an electric machine is electrically connected to the electric energy storage system and is disposed to supply propulsion effort, the method comprising:
  monitoring, via a sensor, current supplied to the electric machine during a drive cycle occurring prior to a charging event;
  determining severity of the drive cycle occurring prior to the charging event for the electric energy storage system based upon the monitored current;
  monitoring a temperature of a component of the electrical charging system during the drive cycle;
  determining a charging profile based upon the severity of the drive cycle and the temperature of the component of the electrical charging system during the drive cycle; and
  commanding, via the controller, operation of the off-board charging device when the vehicle is stationary based upon the charging profile; wherein determining the charging profile includes:
    determining vehicle on-time,
    monitoring an ambient temperature,
    determining a modified vehicle on-time based upon the component temperature, the severity of the drive cycle and the vehicle on-time,
    determining vehicle off-time, and
    determining the charging profile based upon the modified vehicle on-time, the vehicle off-time and the ambient temperature.

9. The method of claim 8, further comprising selecting a default charging profile when the temperature of the component is greater than an upper temperature threshold.

10. An electrical charging system for charging an on-board electric energy storage system of a vehicle via an off-board charging device, comprising:
  an electric machine electrically connected to the electric energy storage system and disposed to supply propulsion effort to the vehicle;
  a current sensor disposed to monitor current flow supplied to the electric machine;
  a controller, operatively connected to the off-board charging device and in communication with the electrical charging system, the on-board electric energy storage system, the current sensor and the electric machine;
  the controller including an instruction set, the instruction set executable to:
    monitor current supplied to the electric machine during a drive cycle occurring prior to a charging event;
    determine severity of the drive cycle occurring prior to the charging event for the electric energy storage system based upon the monitored current;
    determine a charging profile based upon the severity of the drive cycle; and
    command operation of the off-board charging device when the vehicle is stationary based upon the charging profile; wherein the instruction set executable to determine the charging profile includes:
      determine vehicle on-time,
      monitor a temperature of a component of the electrical charging system and an ambient temperature,
      determine a modified vehicle on-time based upon the component temperature, the severity of the drive cycle, and the vehicle on-time,
      determine vehicle off-time, and
      determine the charging profile based upon the modified vehicle on-time, the vehicle off-time and the ambient temperature.

11. The electrical charging system of claim 10, further comprising the instruction set executable to:
  monitor a temperature of a component of the electrical charging system during the drive cycle;
  compare the temperature of the component to an upper temperature threshold; and
  select a default charging profile including a default charging current when the temperature of the component is greater than an upper temperature threshold.

12. The electrical charging system of claim 10, wherein the charging profile comprises a magnitude of charging current and an elapsed time for charging.

13. The electrical charging system of claim 10, further comprising the instruction set executable to select a default charging profile including a default charging current based upon the modified vehicle on-time, the vehicle off-time and the ambient temperature.

14. The electrical charging system of claim 10, further comprising the instruction set executable to select a modified charging profile including a charging current that is greater than the default charging current based upon the modified vehicle on-time, the vehicle off-time and the ambient temperature.

15. The electrical charging system of claim 10, further comprising the instruction set executable to command operation of the off-board charging device based upon the charging profile including commanding electric current flow and an elapsed charging time for the commanded electric current flow form the off-board charging device to the electric energy storage system.

16. The method of claim 1, comprising determining the severity of the drive cycle occurring prior to the charging event for the electric energy storage system based upon the monitored current, wherein the severity of the drive cycle is determined based upon an RMS value for the monitored current occurring prior to the charging event.

17. The electrical charging system of claim 10, wherein the severity of the drive cycle is determined based upon an RMS value for the monitored current occurring prior to the charging event.

\* \* \* \* \*